United States Patent [19]

Anderson et al.

[11] Patent Number: 5,490,583

[45] Date of Patent: Feb. 13, 1996

[54] MAGNETICALLY-OPERABLE BRAKE DEVICE

[75] Inventors: Peter Anderson; Stuart J. Inglis, both of Angus, Scotland

[73] Assignee: TI Matrix Engineering Limited, Scotland, United Kingdom

[21] Appl. No.: 193,840

[22] Filed: Feb. 9, 1994

[30] Foreign Application Priority Data

Feb. 10, 1993 [GB] United Kingdom .................. 9302623

[51] Int. Cl.6 .................................................. H02K 49/10
[52] U.S. Cl. ............................ 188/161; 188/164; 310/77
[58] Field of Search ..................................... 188/161, 164, 188/71.5; 192/84 PM; 310/76, 77, 78

[56] References Cited

U.S. PATENT DOCUMENTS

| 2,765,878 | 10/1956 | Pierce | 188/164 |
| 3,199,645 | 8/1965 | Henning | 188/164 |
| 3,512,618 | 5/1970 | Schafer | 188/161 |
| 3,899,061 | 8/1975 | Krug | 192/84 |
| 3,902,581 | 4/1975 | Knudsen | 188/161 |
| 4,717,865 | 1/1988 | Caputo | 318/362 |
| 5,121,018 | 6/1992 | Oldakowski | 310/77 |
| 5,185,542 | 2/1993 | Lazorchak | 310/36 |

FOREIGN PATENT DOCUMENTS

| 2601121 | 7/1976 | Germany . | |
| 2638944 | 5/1978 | Germany . | |
| 3434116 | 3/1986 | Germany . | |
| 0303331 | 12/1989 | Japan | 188/161 |

*Primary Examiner*—Matthew C. Graham
*Attorney, Agent, or Firm*—Seidel Gonda Lavorgna & Monaco

[57] ABSTRACT

A brake device comprises a stack of friction plates (6,7) compressible to have a braking effect between an armature (9) and a magnet structure (10,) the structure including a permanent magnet (11) urging the armature towards the magnet structure to effect braking, and an electromagnet (12) energizable to augment the effect of the permanent magnet, or to oppose it either partially or completely so as to release the braking effect.

1 Claim, 3 Drawing Sheets

MAGNETICALLY-OPERABLE BRAKE DEVICE

FIELD OF THE INVENTION

The invention relates to an electrically controllable brake device.

BACKGROUND OF THE INVENTION

It is a disadvantage of electrically controllable brake devices that they become ineffective on failure of the energizing power supply, so that the braking effects required from the devices are no longer available.

It is accordingly an object of the invention to provide an electrically controllable brake device from which a braking effect is permanently available, and can be selectively augmented or negated.

SUMMARY OF THE INVENTION

In accordance with the invention, an electrically controllable brake device comprises braking means responsive to an electromagnet which can be selectively energized so as to produce a braking force dependent on the energization, and also to a permanent magnet.

The permanent magnet can provide a braking force which will persist in the event of failure of the supply energizing the electromagnet. The presence of the permanent magnet does not derogate from the control available by means of the electromagnet because this can be energized so as either to augment or to oppose the braking force due to the permanent magnet. By energizing the electromagnet to provide a magnetic flux equal and opposed to that of the permanent magnet, the brake device can be held in the released condition, from which an increasing brake force can be obtained by either increasing the electromagnet energization so that the brake force is due solely to the electromagnet, or by decreasing the energization, until this reaches zero, when only the permanent magnet is operative. From this condition, an immediate increase in brake force can be obtained by energizing the electromagnet with reversed polarity so as to add to the effect of the permanent magnet.

The braking means can conveniently comprise interleaved friction plates, some held against rotation relative to a frame mounting member, and the others being arranged to rotate with a shaft to be braked. The stack of friction plates is received between a fixed magnet structure, including the permanent magnet and the electromagnet, and an armature which can be magnetically attracted to the magnet structure and which is movable along the shaft axis, as are the friction plates, so as to compress the plates together, to effect braking, or to allow them to separate, to release the brake device. A single friction plate could be employed in place of the plate stack.

The invention will thus be seen to provide a brake device which can be effectively electrically controlled but which reliably applies a braking force in the event of power failure.

BRIEF DESCRIPTION OF THE DRAWINGS

The invention is further described below, by way of example, with reference to the accompanying drawings, in which.

Figure 1:
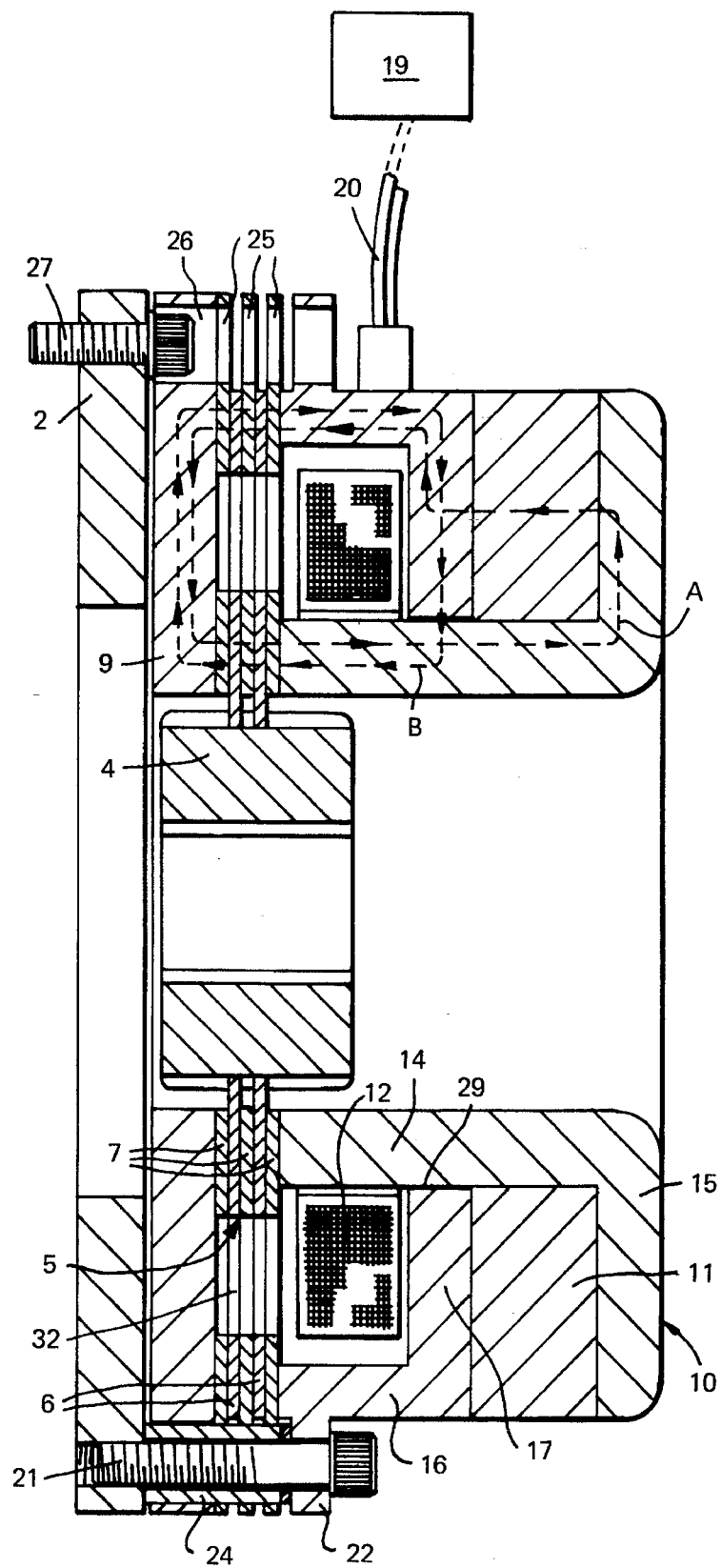
FIG. 1 is a sectional side view of an electrically controllable brake device embodying the invention.

The brake device illustrated comprises a mounting plate 2 and a hub 4 having an internal bore within which a rotatable shaft (not shown) to be braked is received. The shaft is typically an electric motor or gearbox shaft and the mounting plate is then secured to the motor or gearbox housing or frame. The hub 4 and the shaft are connected together against relative rotation by means of a splined connection.

Concentrically surrounding the hub 4 is a friction plate stack 5 comprising a plurality of annular inner friction plates 6 interleaved between annular outer friction plates 7. A splined connection between the outer surface of the hub 4 and the inner edges of the inner friction plates 6 allows relative axial sliding between the hub and the plates but ensures that they rotate together.

The friction plates are of magnetically permeable material, and the friction plate stack 5 is received between an annular armature 9 which co-operates with a magnet structure 10 comprising a permanent magnet 11 and an electromagnet 12.

The magnet structure 10 is annular in form and concentric with the hub axis. It consists of an inner and an outer pole component. The inner component comprises a sleeve 14 with an outwardly turned flange 15 at its outer end, that is, the end remote from the friction plate stack 5. The outer pole component also comprises a sleeve 16 with a flange 17 at its outer end. The flange 17 is inwardly turned and located about midway between the flange 15 and the friction plate stack 5. The flanges 15 and 17 are perpendicular to the hub axis and define between them an annular space occupied by the permanent magnet 11. The space between inner flange 17 and the friction plate stack 5 is occupied by the coil of the electromagnet 12, which can be selectively and controllably energised by variable direct current from a control source 19 (shown schematically), by way of leads 20.

The magnet structure 10 is secured to the mounting plate 2 by a first set of angularly spaced bolts 21 each extending into a tapped hole in the mounting plate through an aperture in an out-turned flange 22 of the sleeve 16 through a spacer 24 received in apertures 25 in the friction plates 7, adjacent to their outer peripheries, and through apertures 26 in the armature 9. Bolts 27 of a second set are received directly in tapped mounting plate apertures, with their heads in the armature apertures 26.

These mounting arrangements fixedly secure the magnet structure 10 to the mounting plate 2, and restrain the armature 9 and the outer friction plates 7 against angular or rotational movement about the hub axis, whilst allowing them limited axial movements.

As shown at the upper part of FIG. 1 only, the permanent magnet 11 provides a magnetic flux, indicated by the arrow A, which extends through the magnet, into the flange 17 and the sleeve 16, to a pole face constituted by the inner end of the sleeve. The flux continues through the friction plate stack 5, into the armature 9, through the stack against to a second pole face constituted by the inner end of the sleeve 14, and through this sleeve and the flange 15 to the magnet. The effect of this magnetic flux is to apply a permanent braking force, by compression of the friction plate stack 5 between the armature 9 and the magnet structure 10.

Energization of the coil of the electromagnet 12 by direct current of appropriate polarity produces a second magnetic flux indicated by the arrows B. This flux flows in the flange 17, the sleeve 14, through the friction plate stack 5 and armature 9 to the sleeve 16, extending through only the inner portion of this sleeve, to the flange 17. The fluxes due to the permanent magnet 11 and the electromagnet 12 have most of their flux paths in common, but it is important that the electromagnetically induced flux does not actually flow through the magnet 11, to avoid damage to its magnetic properties. A radial airgap 29 is therefore provided between the flange 17 and the sleeve 14.

Figure 2:
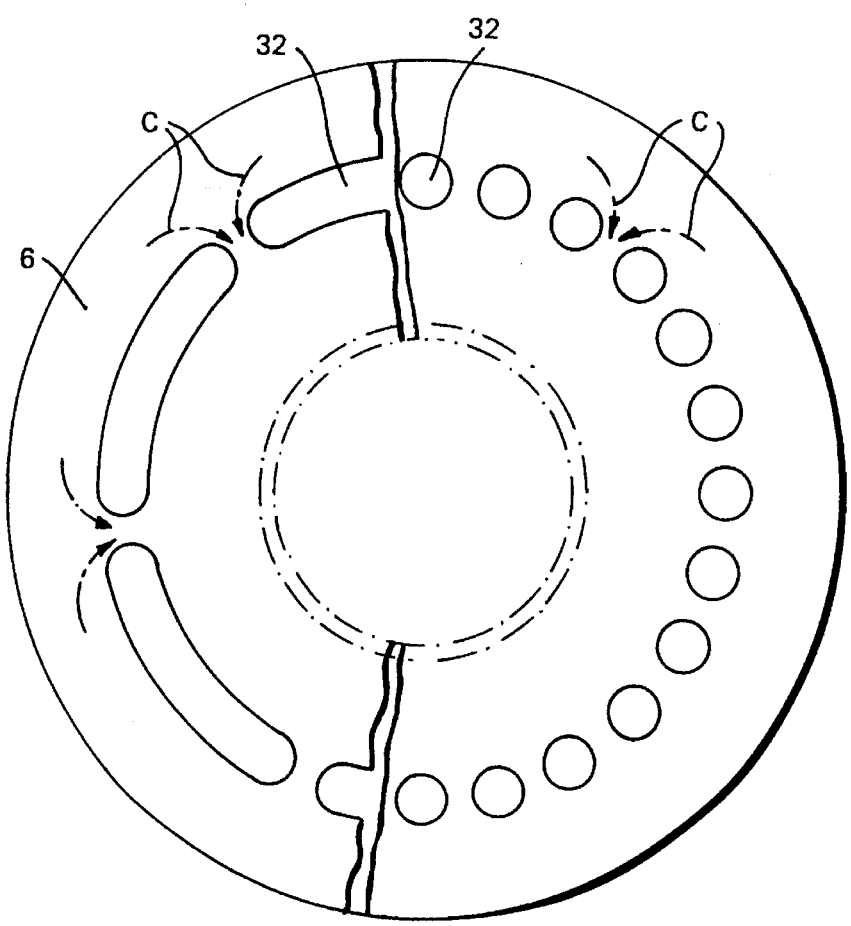
FIGS. 2 & 3 are respectively axially and edge views of a friction plate employed in the brake device of FIG. 1.
Figure 3:
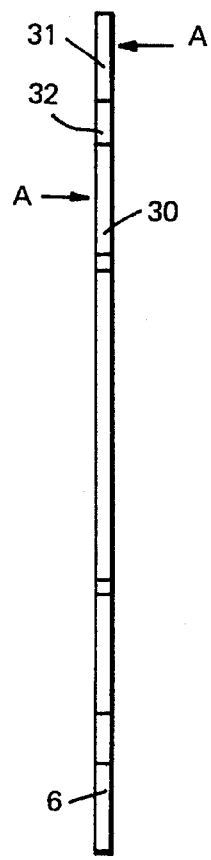

It is also important to minimize flux leakage radially of the friction plates 6 & 7. One of the inner friction plates 6 is illustrated in FIGS. 2 and 3, and referring to FIG. 3, magnetic flux due to the permanent magnet 11, with or without flux due to the electromagnet 12, passes through the plate at an inner annular band 30 and an outer annular band 31. The positions of these bands correspond to the pole faces at the inner ends of the sleeves 14 & 16. Flux leakage radially of the plate, indicated by arrows C in FIG. 2, is minimized by the provision of apertures 32 in the form of arcuate slots or a concentric series of holes located between the two annular bands. The friction plates 7 are similarly apertured at corresponding radial positions.

Depending on the direction and level of the electric current flowing in the coil of the electromagnet 12, the magnetic flux due to the permanent magnet 11 can be at least approximately neutralised or counteracted or augmented.

Figure 4:
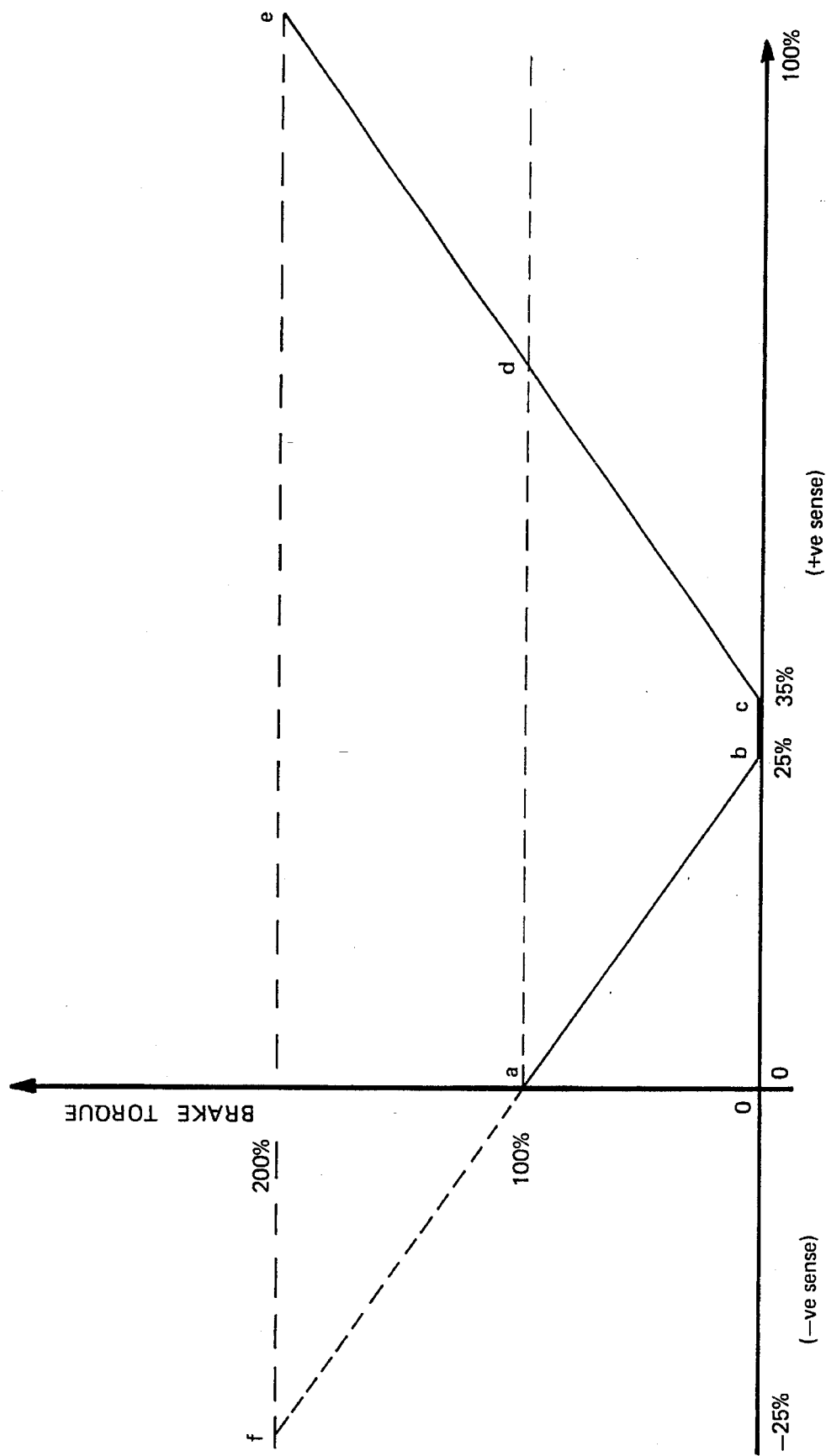
FIG. 4 graphically represents the relationship between a brake torque and applied brake coil voltage for the brake device of FIG. 1.

In FIG. 4, brake torque is plotted against the voltage applied to the coil of the electromagnet. Point "a" represents the condition of the brake device with zero brake coil voltage. The permanent magnet 11 is then alone effective and applies the rated torque of the device, indicated as 100%. If now the voltage is increased in a direction to create the magnetic flux indicated by the arrows B, which is in opposition to permanent magnet flux, the brake torque correspondingly reduces, until between points "b" and "c", the two fluxes cancel each other out. The armature 9 then experiences no magnetic attraction to the magnet structure 10 and the brake is released, allowing free rotation of the hub 4 and the associates shaft.

By increasing the voltage beyond point "c", the rated torque is reached again at point "d" by flux due to the electromagnet alone. The torque can be increased, say, up to 200% of rated torque, a condition shown at point "e", by further increasing the voltage. Corresponding reduction of the voltage to zero causes the torque characteristic to be retraced back to the rated torque at point "a".

By increasing the voltage from zero in the opposite (negative) sense, the rated torque due to the permanent magnet 11 can be augmented immediately so as to reach, for example, 200% of rates torque, as indicated at point "f". The torque characteristic illustrated in FIG. 4 is typical but widely different characteristics can be obtained by appropriate design.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. The A method of operating a magnetically operable braking device comprising the steps of:

providing a permanent magnet to cause said braking device to apply a braking force, energizing an electromagnet to oppose said action of said permanent magnet, further energizing said electromagnet so as to cancel said action of said permanent magnet, and increasing the energization of said electromagnet beyond the point at which it cancels said action of said permanent magnet to cause said braking device to apply a braking force.

* * * * *